United States Patent [19]

Bloch et al.

[11] Patent Number: 5,708,253

[45] Date of Patent: Jan. 13, 1998

[54] APPARATUS AND METHOD FOR COMPUTERIZED INTERACTIVE CONTROL, MEASUREMENT AND DOCUMENTATION OF ARC WELDING

[75] Inventors: Christopher J. Bloch, Kingswood; Don Harrison; John Hill, both of Houston, all of Tex.

[73] Assignee: Hill Technical Services, Inc., Houston, Tex.

[21] Appl. No.: 476,780

[22] Filed: Jun. 7, 1995

[51] Int. Cl.$^6$ .................................................. B23K 9/095
[52] U.S. Cl. ............................ 219/130.01; 219/130.21; 219/132; 219/137 PS
[58] Field of Search .................. 219/130.01, 130.21, 219/132, 137 PS, 483; 228/103

[56] References Cited

U.S. PATENT DOCUMENTS

| | | | |
|---|---|---|---|
| 2,276,643 | 3/1942 | Bates | 219/483 |
| 3,560,712 | 2/1971 | Toohill | 219/483 |
| 3,851,141 | 11/1974 | Cooper | 219/132 |
| 4,103,141 | 7/1978 | Wristen . | |
| 4,359,622 | 11/1982 | Dostoomian et al. . | |
| 4,375,026 | 2/1983 | Kearney . | |
| 4,385,223 | 5/1983 | Thommes . | |
| 4,447,703 | 5/1984 | Stol . | |
| 4,578,562 | 3/1986 | Lindström et al. . | |
| 4,605,836 | 8/1986 | Retfalvi et al. | 219/130.01 |
| 4,721,947 | 1/1988 | Brown | 228/103 |
| 4,973,814 | 11/1990 | Kojima et al. . | |
| 5,140,123 | 8/1992 | Mitani . | |
| 5,223,683 | 6/1993 | Ishizaka . | |
| 5,278,382 | 1/1994 | Rische et al. . | |
| 5,302,799 | 4/1994 | Kennedy et al. . | |
| 5,317,125 | 5/1994 | Rossi . | |
| 5,319,179 | 6/1994 | Joecks et al. . | |

OTHER PUBLICATIONS

Byrd, "Inverter Power Sources: An Efficient Alternative", *Welding Journal*, 1/1993, pp. 37–40.

"For the Welding Industry", Control and Inspection Services, Inc.

"75 KVA Heat Treatment Centre", Control and Inspection Services, Inc.

"Heat Treating and Welding Products for Industry", Richter Industries, Inc.

"P135–6 Heat Treatment Control Centre", Global Heat.

"Modern Welding Technology", Howard B. Cary, 1981, pp. 264–266.

(List continued on next page.)

*Primary Examiner*—Clifford C. Shaw
*Attorney, Agent, or Firm*—Jenkens & Gilchrist, P.C.; J. Kevin Gray

[57] ABSTRACT

An apparatus and method for computerized interactive control, measurement and documentation of are welding utilizing a single power source that facilitates continuous precision welding. Operational interactivity between the welding operations and the workpiece operations, in connection with predetermined optimum welding operational parameters, provides contemporaneous feedback of critical welding operational parameters to the welding operator, producing an alarm if welding is attempted outside a first predetermined range of deviation from optimum welding operational parameters and temporarily interrupting power to the welding operation if welding is attempted outside of a second predetermined range of deviation from the optimum welding operation parameters. A complete log of the welding operational parameters is stored for subsequent retrieval and display, providing training and evaluation of welding operators as well as verification of compliance with required welding practices and procedures. Methods of performing continuous precision welding, facilitating temperbead welding, training and qualifying welders for such operations and verifying practice and procedure compliance are available utilizing the above-described apparatus.

61 Claims, 3 Drawing Sheets

OTHER PUBLICATIONS

"Welding Handbook", American Welding Society, 1987, vol. 1, pp. 77–79, 473; vol. 2, pp. 9–11, 31, 84, 238, 206–207, 253–255, 288, 370.

"Heat Treatment Equipment Guide", Cooperheat, 1985.

"Thermal Engineers", Mannings, 1989.

"Products and Services", Cooper Heat (UK), Ltd., 1986.

"The Inverter Welding Power Source", Tech Talk, reprinted, Spring 1987, MEMCO News a/k/a Miller Electric Mfg. Co., Marv Schiedermayer, 1987.

"6–Way Power Source", Cooperheat, 1994.

"Three Mode Programmer", Control and Inspection Services, Inc.

"MA–8Z Heat Controller", Heating and Welding Chart, Richter, 1991.

"Richter Heat Controller", Model MA–8Z, General Specifications, Richter Industries, Inc.

"A New Revolutionary Heat Controller From Richter Industries", Richter Industries, Inc.

"Small, Mighty Inverters Deliver Big Benefits" Special Report, Welding Design & Fabrication Magazine, Apr. 1994.

"Inverters Help Welders Deposit Tons of Filler", Gene H. Steen, Jr. and Eugene B. Roy, Welding Design & Fabrication Magazine, Apr. 1994.

"Stresstech", Preheating and Post Weld Heat Treatment Equipment Manual.

"Accessories for Electrical Heat Treating" Brochure, Hill Technical Services, Inc., Rev. 08/94.

APPARATUS AND METHOD FOR COMPUTERIZED INTERACTIVE CONTROL, MEASUREMENT AND DOCUMENTATION OF ARC WELDING

TECHNICAL FIELD

This invention relates to welding and, more particularly, to an apparatus and method for precision welding utilizing a single power supply and operational interactivity between the welding power source and a pre-, post and interpass heat control device for quality assured performance of critical welds.

BACKGROUND OF THE INVENTION

The permanent union of metal by arc welding is widely practiced in a myriad of industries. The quality of such welding is a function of many complex factors including the skill of the welding operator, the temperature of the arc, the temperature of the workpiece, the presence of contaminants, the internal chemical makeup of the metal in question, etc. While it is impossible to perfectly control all such factors, the quality of welding is often of critical importance. Of obvious importance are situations where the public welfare and safety rest in part on the quality of the welded joint. Welds used in critical components of a nuclear power plant, fossil fueled power plants, refineries, pipe lines, chemical plants and steel reinforced structures in regions with seismic activity are but a few examples. Accordingly, the federal and many state governments heavily regulate the practices and procedures associated with such welding operations. Examples of such practices include: ASME Boiler and Pressure Vessel Code; Section 1, "Rules for Construction of Power Boilers;" Section III, "Rules for Construction of Nuclear Power Plant Components;" Section VIII, "Rules for Construction of Pressure Vessels;" Section IX, "Welding and Brazing Qualifications;" ANSI B31.1, "Power Piping;" and ANSI B31.3, "Chemical Plant Piping." In addition to these are many practices and procedures recommended by professional organizations such as the American Welding Society (AWS) and the American Petroleum Institute (API).

Since the mechanical qualities of a weld are, in part, a function of maintaining a proper temperature in and around the weld location, many regulations require that the workpiece be preheated to a specific temperature range prior to the welding operation. Others also require that the workpiece be maintained within a particular temperature range between successive applications of weld metal achieved through repeated passes of the welding electrode over the weld joint (the interpass). Still other standards require heating welds to specific temperature ranges for specific time periods following the welding operation (post-heating).

Control and monitoring of these pre-, interpass and post-heating temperatures is typically accomplished in one of several ways. These method include: (1) application of a torch flame to the metal workpiece; (2) electrical resistance heating elements secured to the metal workpiece; (3) induction heating coils applied to the workpiece; and (4) radiant infrared heating lamps or elements applied to or near the workpiece.

The joining of metal parts in critical applications can be divided roughly into two operations: (1) the welding operation; and (2) the workpiece operation. For purposes of this Application, the term "welding operation" will refer to the heating of the workpiece surface and a filler metal at the point of joining by means of an electrical arc sufficient to melt both the surface of the workpiece and the filler metal, wherein the combined pool of molten metal will subsequently cool to form one continuous mass of metal. For the purpose of this Application, the term "workpiece operation" will refer to supplemental pre-, interpass and post-heating of the subject workpiece adjacent to and including the weld joint.

In the "welding operation" referred to in this application, the temperatures necessary to melt both the workpiece surface and the filler metal are achieved by means of an electric arc. Precision control of the arc energy is critical to this operation. Inadequate arc energy will not generate temperatures sufficiently hot to achieve complete melting of the workpiece surfaces. In such cases, the solidifying molten metal pool will not continuously fuse to the workpiece. Excessive arc energy will provide adequate temperatures to melt both the workpiece surfaces and the filler metal, however, it may also result in "arc blow-through" of the weld area, the generation of excessive splatter of the molten metal and other undesirable conditions. The welding operator can control arc energy to regulate the weld pool temperature through the careful adjustment of the travel speed and movement of the arc and by manipulation of the voltage and current settings of the welding power source.

Even in the hands of a skilled welding practitioner, there are numerous conditions which frustrate a continuous fusion of the metal workpiece surfaces free of cracks, voids, slag inclusions and other defects. Among the conditions which generate faulty weld bonds are:

(1) Rapid cooling of the weld pool and the adjoining metal (typically referred to as the Heat Affected Zone (HAZ)). This condition produces cracks which form due to stresses generated by the volumetric shrinkage of the metal as the molten metal rapidly cools. As the metal cools and shrinks it generates tension stresses. These stresses can often be sufficiently great as to exceed the yield or tensile strength of the weld metal or the HAZ metal, resulting in distortion or possible failure. The tendency for metal to crack is increased by the presence of atomic hydrogen. Atomic hydrogen increases the tendency of the metal to become brittle, therefore increasing its propensity to crack. One way in which atomic hydrogen is formed is through moisture or hydrocarbon contamination being exposed to the high temperatures generated by the electrical arc. To minimize atomic hydrogen it is common practice to clean the surface to be welded and to eliminate moisture from the surfaces by heating (preheat). Cracking of the weld metal and the HAZ is more likely in certain alloy and high carbon steels due to their intrinsic brittleness. Raising the temperature of the weldment (preheat) typically increases the ability of the metal to flex or stretch without cracking. It is often important to maintain such an elevated temperature throughout the welding process (maintain interpass temperature) to prevent loss of ductility thus preventing crack formation.

Heating of the weld and workpiece metal following the welding process to an elevated temperature sufficient to allow the metal to plastically deform will relieve stresses induced by the weld process. This post weld heat treating, (PWHT), is commonly prescribed to prevent cracking of the weld and HAZ metal. Relief of weld induced stresses is also practiced in situations where the weld will be exposed to a corrosive environment such that accelerated corrosive attack would occur at the highly stressed metal region; and (2) Inclusion of excessive gaseous voids in the weld metal. The action of the electrical arc on the molten metal pool during the welding operation and the agitation generated by the arc and the dropping of molten filler metal into the weld pool often results in tiny bubbles of gas mixing into the molten metal. This gas can be entrained in the molten metal from the immediate atmosphere around the arc or can result from hydrogen generated by the arc due to the presence of moisture or hydrocarbons on the weldment surfaces or on the surface of the electrode or filler metal. Again, with proper arc energy settings and with a skilled weld operator the molten pool of metal formed by the melting of the workpiece surfaces and the molten filler metal will be allowed to solidify without excessive disruption and over sufficient time (typically a fraction of a second to several seconds) to allow entrained gases to separate from the molten metal. The presence of excessive void concentrations is frequently observed at locations where the weld process is started or stopped. This condition occurs in part due to the absence of arc energy being applied immediately before or immediately after the start/stop point. As a result of the lower energy flux, the molten weld pool will tend to solidify more rapidly, thus trapping additional gases in the weld joint. The application of preheat and interpass heat will slow the rate of molten metal solidification particularly during starts and stops. Sufficient preheat and interpass temperatures will also result in lower concentrations of voids in the weld metal generated by concentrations of atomic hydrogen in the weld metal and HAZ metal due to the fact that atomic hydrogen will diffuse out of metal at more rapid rates as temperatures are elevated.

In most arc welding processes a flux is introduced to provide a physical barrier between the molten weld metal pool and the environment. The flux melts and floats on the surface of the weld pool. The flux helps to shield the molten weld metal from atmospheric oxygen which could otherwise oxidize the weld metal. The flux also helps to limit the rate of heat loss due to radiation of heat from the weld pool. Once the flux cools it solidifies as a slag deposit. With improper arc energy settings, poor technique, or too rapid a rate of weld pool solidification, some of the slag becomes entrapped in the weld metal. Again preheat and interpass heating slow the rates of weld metal cooling, giving more time for the slag to completely separate from the weld metal. Subsequent removal of slag deposits by means of chipping, grinding and steel wire brushing is facilitated by proper rates of weld pool solidification and elevated workpiece temperatures. Complete removal of slag deposits between successive additions of weld metal improve weld joint quality.

In some cases, even when the stresses generated in the welded workpiece are not sufficient to crack the metal, the localized stress many combine with caustic or otherwise corrosive conditions to which the welded metal will be exposed to result in stress corrosion cracking or stress induced localized corrosion. Practitioners skilled in the art have learned that the PWHT of weldments exposed to such environments will greatly reduce the occurrence and extent of such corrosion.

To avoid these and other failure conditions, the previously mentioned codes and regulations often require control, monitoring and documentation of temperatures imparted by the welding and workpiece operations. Traditionally, monitoring has been accomplished in a variety of ways, including utilizing crayons, which melt or change color with temperature, thermocouples or infrared temperature indicators, to name just a few.

To ensure compliance with the foregoing, the regulations advise, and often require, that such temperature readings be recorded in graphical or tabular form. Documentation of pre, interpass and post weld temperatures and other variables is therefore of critical importance to assure compliance with applicable regulations. Such documentation is also valuable in non-regulated situations where economic or other considerations generate a need to assure weld quality by control of welding process variables. Weld joint failure may lead to mechanical failures, leakage of hazardous or dangerous products or merely the requirement to grind away poor weld material and repeat all or part of the weld process.

The heat utilized for the workpiece operation is typically supplied by a separate power or heat source from the welding operation power source utilized to generate the electric arc. Often this source is a torch or an electric resistance power supply. One advantage of separate electric resistance power sources is that they are often designed to control, monitor and document the preheat and interpass temperatures. The post-weld heat treating is commonly achieved by means of placing the work in a furnace or by means of wrapping the weldment in electric resistance heating elements which are often controlled, monitored and documented by the same power source used for supply of the preheat and interpass heating. Supply, maintenance and operation of separate heating sources for the workpiece operation typically involve the use of expensive equipment and add complexity to the welding process.

Commonly, electric resistance power sources utilized for workpiece heating are completely separate from the welding power source. In other cases, a welding power source can be equipped with a temperature controller and devices to monitor and record temperatures necessary to provide workpiece heating. A few examples of a separate power source having specialized control units for the workpiece operations include standard equipment manufactured by: Cooperheat of Piscataway, N.J.; Hill Technical Services, Inc. of Houston, Tex.; Mannings USA of Morristown, N.J.; Global Heat of Concord, Calif., and others. Examples of such dual purpose power sources which utilize welding power sources to provide power for workpiece operations include units developed by John Hill of Control and Inspection Services of Houston, Tex. and Richter Industries, Inc. of Scottsdale, Ariz.

Although these prior art means for controlling and monitoring temperatures during the welding process have proved sufficient to elevate, control and record temperature of the workpiece operation, they all share one or more of the following deficiencies: (1) requirement of separate equipment such as gas bottles, hoses, regulators and the like, for example in workpiece operations which utilize flame type torches; (2) requirement of separate power sources, often adversely affecting the power supply to the welding operation power source and requiting manual switching of power sources; (3) lack of operational interactivity between the power sources for workpiece operation and welding operation; (4) lack of contemporaneous monitoring of welding operation parameters, actual welding operation source output, workpiece operation parameters and actual workpiece operation temperatures; and/or (5) lack of detailed record or contemporaneous feedback of workpiece and welding operational parameters to the welding operator or the welding quality control inspector.

Thus a need has risen for an apparatus and method which will facilitate the consistent performance of precision welding, providing and utilizing operational interactivity between the welding power source function, the welding operation, the application, control, monitoring and documentation of the function of the workpiece operation heating power source and the workpiece operation as well as contemporaneous feedback to the welding operator and welding quality control inspector.

SUMMARY OF THE INVENTION

The instant invention overcomes the foregoing and other problems associated with the prior art by providing an apparatus and method to facilitate the consistent performance of precision welding wherein a single primary power supply can be used to power both the welding operation and workpiece operation of the welding process. The invention consists of an apparatus and method for precision welding which includes operational interactivity between the welding operation and the pre-, post and interpass heating components (workpiece operations) of welding. Attempts at welding occurring outside a predetermined temperature range are audibly and/or visually identified to the weld operator and/or the weld quality control inspector. Attempts at welding occurring outside a second predetermined temperature range are precluded via temporary interruption of power for welding operations by the controller of the present invention.

The apparatus of the present invention also allows automatic adjustment of power settings to be programmed into the computerized workpiece power source to adjust the welding operation power source output as a function of changes in the workpiece temperature. Real-time monitoring and recording of key parameters, such as workpiece temperature, and the welding operation power source output voltage and current, is accomplished by a computer controller, providing a complete log of the welding operation for qualification of weld procedures, training, and quality control compliance verification.

The apparatus of the present invention also provides a means of giving the weld operator and weld quality inspector contemporaneous feedback on critical welding operation parameters. This feature provides pre, interpass and post weld temperature control from a single power supply without interference with the welding power source and control of welding arc stability. The apparatus is also configured to allow independent use of the welding power source and the heat control power source without interference to welders, motors or other electrical equipment serviced on the same power main. Prior an devices lack this ability to interactively provide power without interference to other electrical equipment.

The method of the present invention used with the above-described apparatus includes the pre-selection of optimum workpiece temperatures, the setting of temperature limits above and below which the operator is alerted that optimum conditions are not present, the setting of a second set of limits above and below which the power supply for the welding operation is temporarily interrupted, and the programming of the automatic adjustment of power settings of the welding operation power source output as a function of workpiece temperature, optimizing the selection of welding variables including type of weld method, welding operation power source output settings, electrode diameters, workpiece parameter settings, and other variables to achieve the most desirable welded joint during prequalification of the weld procedure.

The method of the present invention is utilized not only to achieve precision arc welding, but is also used to: (1) prequalify weld operators by monitoring the ability of the weld operator to control actual arc energy values including current and voltage against preset values; (2) train weld operators utilizing the monitoring and record of the operator's ability to control arc energy values including actual current and voltage against preset values for different weld procedure conditions and positions; (3) improve the performance of weld operators by providing real time audible or visual feedback indicating to the weld operator actual weld energy power values including voltage and current versus preset values as well as workpiece operation parameters such as workpiece temperature; (4) contemporaneously monitor the performance of both welding and workpiece-operations, as well as welder performance, to provide greater assurance of the consistent performance of precision welding; and (5) monitor and record both preset and actual critical weld and workpiece operation parameters to facilitate greater assurance of the consistent performance of precision welding that conforms to preset optimum conditions.

BRIEF DESCRIPTION OF THE DRAWINGS

A more complete understanding of the invention may be had by reference to the following Detailed Description when taken in conjunction with the accompanying Drawings in which.

DETAILED DESCRIPTION

Figure 1:
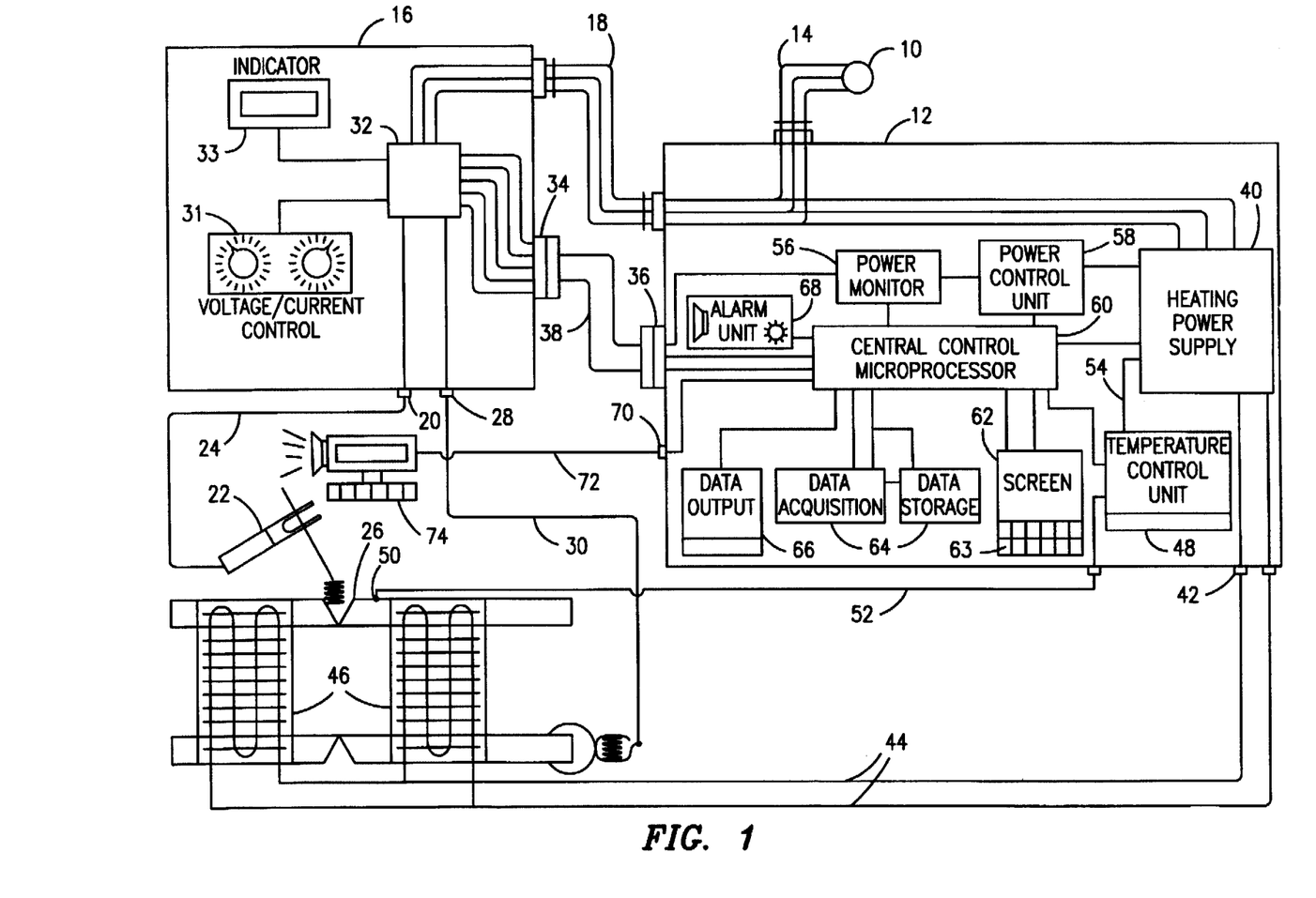
FIG. 1 is a schematic diagram of the apparatus of the present invention used in conjunction with an inverter type welding machine.

Referring now to FIG. 1, there is shown a schematic diagram of the present invention apparatus. A single power supply 10 is connected to a power source controller 12 by means of a power supply cable 14. For purposes of illustration only, the power supply 10 is a 460 volt, three-phase, 30 amp source. It should be noted that any suitable power supply can be used, if desired.

A welding power source 16 is connected to the power source controller 12 by means of a second power cable 18. The welding power source 16 converts power provided via the power source controller 12 from the power supply 10 to a higher amperage, lower voltage supply suitable for arc welding. In a preferred embodiment, the power source controller 12 is a WELDSMART™ unit and the welding power source 16 is an inverter type welding machine such as a Miller model XMT-300. The Miller XMT-300 welding power source is rated at 300 amps output. At full load it requires a maximum input of 21 amps of 460 volt three-phase power. Importantly, the power source controller 12 provides power without interfering with the power supply to other electrical equipment operating on the same power main due to switching transients or unbalanced phase loadings.

The welding power source 16 is further connected through a power tap 20 to a welding torch 22 by a welding lead 24. A workpiece 26 is connected to a return tap 28 of the welding power source 16 by a return lead 30. The welding power source 16 is equipped with controls 31 for voltage and/or current (amperage) and circuitry 32 which monitors actual voltage and/or current. A display 33 on the welding power source 16 visually presents the actual voltage and/or current during welding operation. The welding power source 16 is further equipped with a multi-pin port 34 which is utilized to remotely set and monitor the functions of the voltage/current control and monitoring circuits 31 & 32. In a preferred embodiment, the multi-pin port 34 is connected to a similar second multi-pin port 36 on the power source controller 12 by a multi-wire control cable 38.

The power source controller 12 includes a heating power supply 40 which is connected through heating power source connector 42 via heating power leads 44 to the means for heating the workpiece 46. The means for heating a workpiece 46 are placed around the workpiece 26 adjacent to the site of the weld. Although the means for heating a workpiece 26 are illustrated as resistance heating pads, any suitable means for heating a workpiece, such as means using radiant heat or induction heating, can be utilized, if so desired. As power is provided to the means for heating a workpiece 46, the temperature of the workpiece 26 is raised to facilitate welding. The provision and precise control of the temperature of a workpiece before, during and following an actual weld procedure is critical to the quality of the resultant weld. In a preferred embodiment, the heating power source output is regulated to a maximum of 85 volts of alternating current. Additionally, the power source controller 12 draws on all three phases of the power main equally and modulates the current drawn from the power supply 10 in a controlled and incremental rate to provide power to the means for heating a workpiece 46. This type of control allows for precise control of the temperature of the workpiece 26.

The power source controller 12 also includes a temperature control unit 48 which is connected to means for sensing temperature of the workpiece 50 via sensing line 52. Although the means for sensing temperature 50 is illustrated as a thermocouple, any suitable means for sensing the temperature of a workpiece can be used, if so desired. The temperature control unit 48 is also connected to the heating power supply 40 via heating power supply line 54. The temperature control unit 48 controls the provision of power to the means for heating the workpiece 46 in conformance with a programmed temperature profile and in response to the means for sensing the temperature 50. If the temperature of the workpiece falls below a programmed value, the means for sensing the temperature 50 responds to this condition and the temperature control unit 48 signals the heating power source 40 to provide additional output to the means for heating the workpiece 26, thereby raising the temperature of the workpiece 26. On the other hand, if the temperature of the workpiece 26 exceeds a predetermined value, the means for sensing temperature 50 senses this condition and the temperature control unit 48 signals the heating power source 40 to provide less output to the means for heating the workpiece 46.

A unique feature of the temperature control unit 48 is the precise control of power output by the heating power source 40 through incremental modulation of the output amperage. This feature regulates changes in the heating power source output to respond smoothly and slowly to commands from the temperature control unit 48 so as to avoid any sudden change in demand on the power supply 10 which would otherwise adversely effect control of the welding power source 16 or other electrical equipment supplied by the same power supply 10.

Also included in the power source controller 12 is a power monitor 56 and a power control unit 58. The power monitor 56 is connected to the second multi-pin port 36 and monitors the power demand of the welding power source 16. The power monitor 56 is also connected to the power control unit 58 which, in turn, is connected to the heating power source 40.

Figure 2:
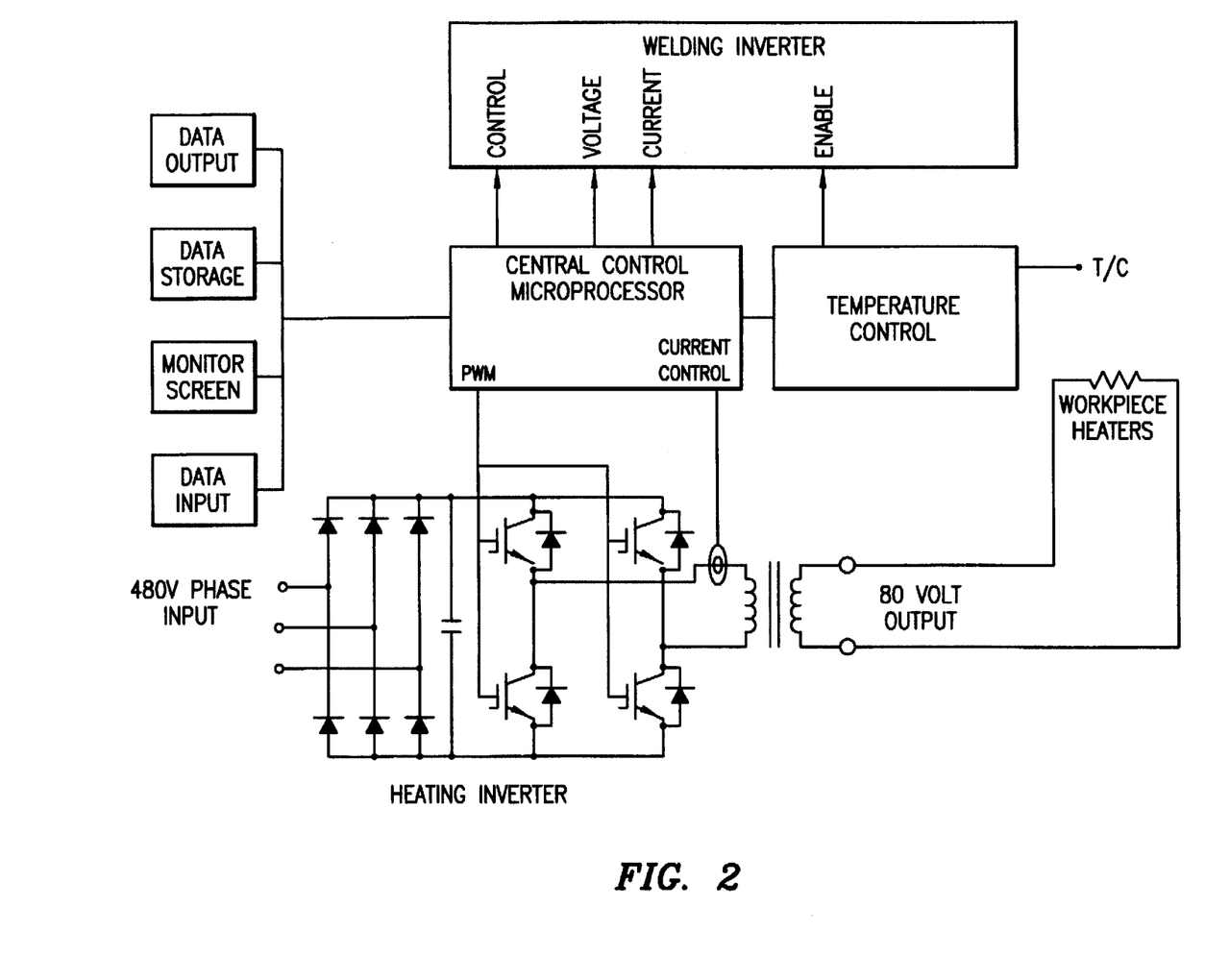
FIG. 2 is a circuit diagram of the control logic circuitry of the apparatus of the present invention.

A central control microprocessor 60 within the power source controller 12 accomplishes the operational interactivity of the present invention apparatus. The central control microprocessor 60 is connected to all of the other components of the power source controller 12. As illustrated in FIG. 2, the central control microprocessor 60 interactively coordinates the functions of these components to facilitate continuous precision welding. Predetermined values for a welding procedure are entered into the central control microprocessor. In a preferred embodiment, entered data typically includes, but is not limited to,: (1) weld tag number; (2) line, vessel or workpiece identification; (3) location and name of the plant where the operation is being performed; (4) welding engineer, the weld operator and weld inspector; (5) minimum preheat temperature; (6) optimum preheat temperature; (7) minimum interpass temperature; (8) optimum low interpass temperature; (9) optimum high interpass temperature; (10) maximum allowable interpass temperature; (11) voltage and/or amperage settings; (12) lower interpass alarm temperature; (13) upper interpass alarm temperature; (14) voltage/amperage adjustment rate as a function of interpass temperature; (15) post weld heat treatment (PWHT) initial ramp rate; (16) PWHT initial temperature set-point; (16) secondary PWHT ramp rate; (17) PWHT soak temperature; (18) PWHT soak time; (19) PWHT temperature fall rate; and (20) PWHT final control temperature.

Variations in arc voltage and current will invariably occur due to movements of the welding torch 22 by the welding operator, variations in the workpiece surface, and the action of the molten metal dropping into the weld pool. The welding power source 16 responds to such variations and continuously adjusts actual output power to the means for producing an electrical arc to maintain preset values. Additionally, the central control microprocessor 60 constantly monitors the power demand and supply of the heating power source 40 of the power source controller 12 and the welding power source 16 such that it can provide power from the power supply 10 to one or both, individually, or simultaneously, in response to input from the heating power source 40, the welding power source 16, the temperature control unit 48, the power monitor 56, the power control unit 58 and preprogrammed welding operational parameters and workpiece operational parameters. The power control unit 58 in the power source controller 12, in response to a signal from the central control microprocessor 60, limits the amount of power which can be diverted from the welding power source 16 to the heating power source 40 of the power source controller 12 to prevent any disruption of the welding arc control by the welding power source 16. Power which is diverted to the heating power supply 40 is converted to a higher amperage, lower voltage alternating current suitable for resistance heating.

The welding operational parameters are ideally monitored by the central control microprocessor 60 at a frequency of at least once per second and as fast as twenty (20) times per second. The actual frequency selected will depend upon welding procedure-specific considerations. At a high frequency of such data monitoring and acquisition, the power source controller 12 is utilized to monitor the skill and technique of the weld operator in controlling the torch and weld pool utilizing different weld processes in different weld positions.

The central control system 60 can be programmed to automatically change the voltage/amperage controls 31 of the welding power source 16 in response to changes in the monitored temperature of the workpiece 26. In practice, the energy of the arc may well add sufficient heat to the workpiece 26 so as to cause the workpiece temperature to climb toward the upper interpass temperature deviation limit during the welding operation. This phenomena will typically occur when the relative energy of the arc is high compared to the mass and natural rate of heat dissipation of the workpiece 26. In such cases the power source controller 12 gradually reduces power to the heating power source 40 to counteract the undesired rise in temperature. At the election of the welding operator or engineer, the central control unit 60 can be programmed to begin to slowly reduce the output power from the welding power source 16 should the workpiece temperature continue to rise. This unique feature of the present invention is preferable to manually resetting the welding power source 16 output. Small incremental reductions in output power to the welding torch 22 by the present invention as a function of workpiece temperature assists the welding operator in maintaining control of the weld pool size and shape and prevents excessive splattering due to excessive heat and arc energy. This feature is especially useful on small workpieces or on workpieces of aluminum or similar alloys which often are prone to increased weld pool size due to increasing workpiece temperatures as a result of the welding operation. This feature also facilitates the quick start of a welding operation by providing a boost of power immediately upon striking the welding torch 22. Once the welding operation begins, the output automatically can be decreased to normal operational levels.

The central control microprocessor 60 can also be programmed to cause the temperature control unit 48 to regulate the heating power source 40 output to follow a post-weld heat treating program as prescribed by regulatory codes and recommended practices. Since such post weld heat treatments are performed only after completion of the welding operation, the central control unit 60 directs the power control unit 58 to divert all available input power to the heating power source 40 once actual welding operations are concluded. The temperature control unit 48 modulates the output current of the heating power source 40 to cause the monitored workpiece temperature to follow the preprogrammed temperature set-point. A unique capability of the present invention apparatus is the ability to disconnect the welding power source 16 from the power source controller 12 prior to or during a post weld heat treatment to allow the welding power source 16 to be utilized for other welding operations without affecting the ability of the power source controller 12 to complete the post weld heat treatment.

Another feature of the power source controller 12 is the ability of the unit to start the preheat of the workpiece 26 at a preset time. In a preferred embodiment the central control microprocessor 60 is equipped with a real time clock (not shown). In use, the welding operator or welding engineer presets the power source controller 12 to begin preheating the workpiece 26 at a predetermined time. This feature allows a workpiece 26 to be at the required preheat temperature at the start of a work shift, for example.

The central control microprocessor 60 also includes: a display 62 for the visual presentation of data, a keypad 63 for entry of data, and means for acquiring and storing data 64 for real time acquisition of welding operational parameters, workpiece operational parameters and other data. Acquired or calculated data typically includes, but is not limited to,: (1) actual welding output voltage vs. time; (2) actual welding output amperage vs. time; (3) workpiece temperature vs. time; (4) voltage/current settings vs. time; (5) actual heating supply output voltage and amperage vs. time; (6) preheat start time; (7) time at which workpiece achieved minimum preheat temperature; (8) welding operation initiation; (9) welding operations completion; (10) total elapsed welding time; (11) total elapsed arc time; (12) total number of arc starts; (13) initiation of PWHT; and (14) PWHT completion. The result is a complete log of welding operational parameters, workpiece operational parameters, and other weld identification information for subsequent use and/or output. Data is stored by the means for acquiring and storing data 64 on any suitable data storage medium, such as magnetic tape or computer disk. Additionally, a data output module 66 directs data acquired and stored during a welding operation to a printer, plotter, chart recorder or like device, if a hard copy of the welding log is desired.

Means for producing an alarm 68 is also within the power source controller 12. Like the foregoing components of the power source controller 12, the means for producing an alarm is connected to the central control microprocessor 60. The means for producing an alarm 68 produces a visual and/or audible alert when attempts at welding occur outside a predetermined range of deviation from a preprogrammed optimum interpass temperature.

Specifically, the central control microprocessor 60 receives a signal from the power control unit 58 that the power welding source 16 is drawing power at a time when the means for sensing the temperature 50 senses that the temperature of the workpiece 26 is outside a first predetermined deviation range from a preprogrammed optimum interpass temperature. The central control microprocessor 60 signals the means for producing an alarm 68 so that an audible and/or visual alarm will be presented to the welding operator. This alarm allows the welder to adjust his or her technique and/or the settings of the welding power source to bring the welding conditions back into the acceptable range of deviation from the preprogrammed optimum interpass temperature before additional attempts at welding occur.

Additionally, the central control microprocessor 60 will signal the power control unit 58 to temporarily prevent output of power from the welding power source 16 to the welding torch 22 in the event attempts at welding occur outside a second predetermined range of deviation from the preprogrammed optimum interpass temperature.

Remote port 70 on the power source controller 12 and remote line 72 allow contemporaneous feedback of welding operational parameters and workpiece operational parameters and presentation of alarms to a welding operator at a location remote from the power source controller 12. A remote keypad 74 allows a welding operator to enter data such as weld identification information, such as weld tag number, name, identification number, date, location, etc., into the central control microprocessor 60 of the power source controller 12. Such data is acquired and stored by the means for acquiring and storing data 64, along with the welding operational parameters and workpiece operation parameters for the welding procedure. Although the remote keypad 74 illustrated is hard-wired to the power source controller 12, the remote keypad could also send data to the power source controller 12 via wireless transmission, if so desired.

Although the present invention apparatus has been illustrated using a stick arc welding operation, the invention would facilitate other arc welding applications including but not limited to, gas tungsten arc welding and metal inert gas welding.

Figure 3:
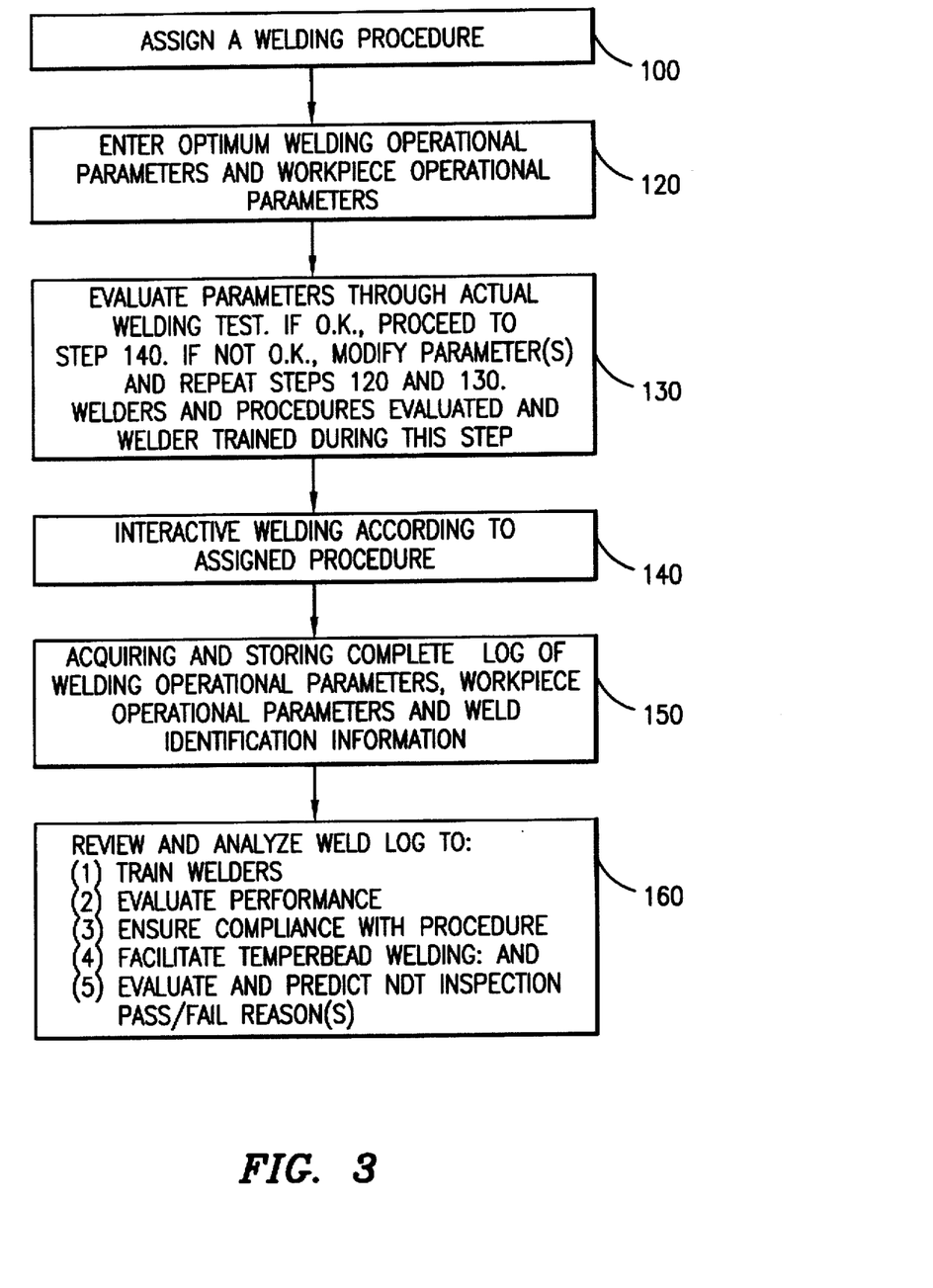
FIG. 3 is a flow diagram of the steps included in the method of the present invention disclosed herein.

A preferred method of the present invention is illustrated in FIG. 3, wherein there is shown a flow diagram of the steps. Initially, a weld procedure is assigned for a welding operation 100. Typically, as mentioned previously herein, such procedures are required, or at least recommended, by laws or professional standards coveting a particular weld operation. Next, optimum welding operational parameters and workpiece operational parameters for said procedure are entered into an apparatus for facilitating precision welding 120. Typically parameters include, but are not limited to: (1) minimum preheat temperature necessary to activate output power from the welding operation power source; (2) maximum preheat temperature above which the welding power source output will be deactivated; (3) target interpass temperature; (4) a first range of temperature deviation above or below which an alarm is triggered; (5) a second range of temperature deviation above or below which welding operation power source output is temporarily interrupted; (6) welding operation power source output settings, including voltage and current; (7) welding electrode size and type, or filler metal wire size and feed rates; and (8) welding operation power source output rate(s) of change as a function of workpiece temperatures.

Once these parameters are preset, the parameters are evaluated through actual welding operation on a test specimen or test area to ensure that such preset parameters perform the weld procedure assigned 130. If the desired results are not obtained using the preset parameters, one or more of the parameters will be modified and steps 120 and 130 are repeated until step 130 indicates that the preset parameters produce the desired weld quality. The performance of one or more welding operators in step 130 is reviewed by a welding engineer or the quality control inspector to determine whether additional reiterations of steps 120 and 130 are needed.

Additionally, during step 130 one or more welding operators can be qualified for the desired welding procedure (i.e., determine whether they can perform the desired welding procedure), reducing or eliminating the need for expensive and time-consuming destructive testing of weld test coupons. Training of welding operators can also occur during step 130, if so desired. Under such circumstances, the weld operator would be given contemporaneous feedback and/or shown a record of his or her attempt(s) to adhere to the assigned welding procedure. If needed, the weld operator would be given instruction and tips on how to improve his or her technique, as well as the opportunity for additional practice.

Once the preset parameters have been finalized and one or more weld operators have been qualified as capable of meeting the performance criteria of the assigned weld procedure, actual production of the defined precision welding procedure on an actual production workpiece is then accomplished (140). Step 140 includes welding operator(s) interactively welding on the workpiece(s) in response to contemporaneous feedback of welding operational parameters, workpiece operational parameters, alarms and temporary interruptions of the welding procedure. As previously described, attempts at welding outside a first predetermined temperature deviation from the optimum parameters are identified audibly or visually to the welding operator so that minute modifications in settings, form, etc. can be accomplished. Attempts at welding outside a second predetermined range of temperature deviation from the optimum parameters result in a temporary interruption of power to the welding arc, thus preventing welding until the optimum temperature range is regained.

Occurring simultaneously with step 140 is step 150, wherein a weld record is acquired on a real time basis and compiled by acquiring and storing a complete log of the welding operational parameters and workpiece operational parameters during the welding operation.

Upon successful completion of steps 140 and 150, the welding engineer or quality control inspector evaluates the completed weld by reviewing the weld record 160. Evaluation of the weld record plays a key role in determining whether to proceed immediately with post weld heat treatment before proceeding with the NDT inspection. The ability to proceed directly from the weld operation into PWHT can save valuable time and expense when the workpiece operation dictates that a relatively high interpass temperature is required. Under such circumstances the workpiece power source can be programmed to raise the workpiece temperatures in a controlled fashion as prescribed by the applicable codes and recommended practices starting from the elevated interpass temperature without first allowing the workpiece to cool to perform NDT testing only to subsequently be required to re-heat the workpiece as part of the PWHT procedure.

Additional uses for the compete weld record include, but are not limited to: (1) providing assurance that the desired weld procedures were properly and consistently implemented; (2) assisting in defining appropriate weld and workpiece operations for future work on the same or similar workpieces; (3) training welding operators; (4) evaluating the performance of welding operators; (4) evaluating the cause of a weld joint's failure of NDT inspection; and (5) facilitating temperbead welding.

Only the preferred embodiments of the invention have been described. It should be understood that the invention is not limited to the embodiments disclosed, but is intended to embrace any alternative, modification, rearrangements, or substitutes of parts or elements as fall within the spirit and scope of the invention.

We claim:

1. An apparatus to facilitate the consistent performance of precision welding, comprising:

a power source;

a power source controller;

means for producing an electric arc;

means for heating a workpiece;

means for sensing temperature of the workpiece;

said power source controller controlling the power source to interactively provide power output to the means for producing an electric arc and to the means for heating a workpiece in response to input from the means for heating the workpiece, input from the means for sensing the temperature of the workpiece, input from the means for producing an electric arc, and predetermined welding operational parameters.

2. The apparatus of claim 1, wherein the power source controller includes a power monitor and an interactive control microprocessor to monitor power demand and supply of the means for producing an electric arc and power demand and supply of the means for heating a workpiece and to control interactive provision of power by the power source to the means for producing an electric arc and the means for heating a workpiece in response thereto.

3. The apparatus of claim 1, wherein the power source controller prevents output of the power source to the means for producing an electric arc until the means for sensing temperature of the workpiece detects a predetermined minimum temperature value.

4. The apparatus of claim 1, wherein the power source controller controls power output of the power source to the means for heating a workpiece in response to input from the means for sensing temperature of the workpiece to maintain a predetermined optimum interpass temperature.

5. The apparatus of claim 4, wherein the power source controller further includes means for producing an alarm when demand from the means for producing an electric arc occurs above or below a first predetermined range of deviation from the predetermined optimum interpass temperature.

6. The apparatus of claim 5, wherein the alarm produced is visual.

7. The apparatus of claim 5, wherein the alarm produced is auditory.

8. The apparatus of claim 1, wherein the means for heating a workpiece includes resistance heating.

9. The apparatus of claim 1, wherein the means for heating a workpiece includes induction heating.

10. The apparatus of claim 1, wherein the means for heating a workpiece includes radiant heating.

11. The apparatus of claim 1, wherein the power source controller further includes means for temporarily interrupting power output from the power source to the means for producing an electric arc when demand from the means for producing an electric arc occurs above or below a second predetermined range of deviation from the predetermined optimum interpass temperature.

12. The apparatus of claim 1, wherein the power source further includes means for automatically modulating the output power of the means for producing an electric arc in response to deviations from a predetermined range of temperatures of the workpiece.

13. The apparatus of claim 12, wherein the means for automatically modulating the output power of the power source to the means for producing an electric arc modulates said output power at a programmed rate.

14. The apparatus of claim 1, wherein the means for sensing the temperature of the workpiece is a bimetallic thermocouple.

15. The apparatus of claim 1, wherein the means for temperature of the workpiece includes a radiant energy measurement device.

16. The apparatus of claim 1, wherein the means for producing an electric arc is a conventional thyristor design.

17. The apparatus of claim 1, further including means for monitoring and displaying welding operational parameters and workpiece operation parameters.

18. The apparatus of claim 1, wherein welding operational parameters are monitored at a frequency of at least once per second.

19. The apparatus of claim 1, further including means for electronically acquiring and storing the welding operational parameters and workpiece operational parameters monitored during welding operations for subsequent retrieval and display.

20. The apparatus of claim 19, wherein the means for electronically acquiring and storing welding operational parameters and workpiece operational parameters further includes clock means for referencing a sequence of data acquisition.

21. The apparatus of claim 1, further including means for displaying the welding operational parameters and workpiece operational parameters monitored during welding operations.

22. The apparatus of claim 19, wherein the means for electronically storing welding operational parameters and workpiece operational parameters is a magnetic tape.

23. The apparatus of claim 19, wherein the means for electronically storing welding operational parameters and workpiece operational parameters is a memory disk.

24. The apparatus of claim 21, wherein the welding operational parameters and workpiece operational parameters acquired and stored are outputted to a printer, plotter or chart recorder.

25. The apparatus of claim 21, wherein the welding operational parameters and workpiece operational parameters acquired and stored are outputted to a screen display.

26. The apparatus of claim 21, wherein the welding operation parameters and workpiece operational parameters acquired and stored are outputted to a computer disk.

27. The apparatus of claim 1, further including means for providing to an operator of the apparatus contemporaneous feedback of welding operational parameters and workpiece operational parameters and alarm status during welding operation.

28. The apparatus of claim 27, wherein the contemporaneous feedback is auditory.

29. The apparatus of claim 27, wherein the contemporaneous feedback is visual.

30. The apparatus of claim 27, wherein the means for providing contemporaneous feedback to the operator of the apparatus further includes means for providing said contemporaneous feedback to a location remote from the apparatus.

31. The apparatus of claim 30, wherein the means for remote provision of contemporaneous feedback includes wired transmission.

32. The apparatus of claim 30, wherein the means for remote provision of contemporaneous feedback includes wireless transmission.

33. The apparatus of claim 30, wherein the means for remote provision of contemporaneous feedback includes a keypad for input of data with the power source controller from the remote location.

34. The apparatus of claim 33, wherein the data input with the power source controller includes weld identification information.

35. The apparatus of claim 34, further including means to prevent welding operations from occurring if the weld identification entered into the power source controller does not match predetermined values for a particular weld operation.

36. An apparatus to facilitate the consistent performance of precision welding, comprising:

a power source;

a power source controller;

means for producing an electric arc;

means for heating a workpiece;

means for sensing temperature of the workpiece;

said power source controller including a monitor and interactive control circuitry to monitor power demand and supply of the means for producing an electric arc and power demand and supply of the means for heating a workpiece;

said power source controller further including means for producing an alarm when demand from the means for producing an electric arc occurs above or below a first predetermined range of deviation from a predetermined optimum interpass temperature;

said power source controller further including means for temporarily interrupting power output from the power source to the means for producing an electric arc when demand from the means for producing an electric arc occurs above or below a second predetermined range of deviation from the predetermined optimum interpass temperature;

said power source controller further including means for automatically adjusting output of the power source in response to deviations in the temperature of the workpiece as sensed by the means for sensing temperature of the workpiece;

means for electronically acquiring and storing welding operational parameters and workpiece operational parameters monitored during welding operations for subsequent retrieval and display;

means for providing to an operator of the apparatus contemporaneous feedback of welding operational parameters and workpiece operational parameter and alarm status during welding operation; and means for data input to the power source controller;

said power source controller controlling the power source to interactively provide power output to the means for producing an electric arc and to the means for heating a workpiece in response to input from the means for heating the workpiece, input from the means for sensing the temperature of the workpiece, input from the means for producing an electric arc, input from the means for data input, means for automatically adjusting output of the power source in response to deviations in the temperature of the workpiece, and predetermined welding operational parameters.

37. An apparatus for heat treatment of a workpiece powered from a power main having other electrical equipment drawing power from said power main, comprising:

a power source;

a power source controller;

means for heating a workpiece;

means for sensing temperature of the workpiece;

said power source controller modulating power output to the means for heating a workpiece in response to input from the means for heating the workpiece, input from the means for sensing the temperature of the workpiece and predetermined workpiece operational parameters; and said power source controller capable of modulating power output to the means for heating a workpiece without interfering with supply of power to additional electrical equipment powered by said power main.

38. The apparatus of claim 37, wherein the power source draws on all three phases of said power main equally.

39. The apparatus of claim 37, wherein the power source provides alternating current output to the means for heating a workpiece.

40. The apparatus of claim 37, wherein the power source controller modulates amperage output of the power source.

41. The apparatus of claim 40, wherein modulation of the amperage output of the power source is at a controlled and incremental rate.

42. The apparatus of claim 37, wherein the power source controller automatically adjusts the output power of the power source in response to deviations in the temperature of the workpiece.

43. The apparatus of claim 42, power source controller automatically adjusts the output power of the power source in response to deviations in the temperature of the workpiece at a programmable controlled and incremental rate.

44. The apparatus of claim 37, further including means for electronically acquiring and storing the workpiece operational parameters monitored during workpiece operations for subsequent retrieval and display.

45. The apparatus of claim 44, wherein the means for electronically acquiring and storing workpiece operational parameters further includes clock means for referencing a sequence of data acquisition.

46. The apparatus of claim 37, further including means for displaying the workpiece operational parameters acquired and stored during workpiece operations.

47. The apparatus of claim 44, wherein the means for electronically storing workpiece operational parameters is a magnetic tape.

48. The apparatus of claim 44, wherein the means for electronically storing workpiece operational parameters is a computer disk.

49. The apparatus of claim 46, wherein the workpiece operational parameters acquired and stored are outputted to a printer, plotter or chart recorder.

50. The apparatus of claim 37, further including means for providing to an operator of the apparatus contemporaneous feedback of workpiece operational parameters during workpiece operations.

51. The apparatus of claim 37, wherein output from the means for heating a workpiece is varied by incrementally increasing or decreasing the amperage output provided to the means for heating a workpiece.

52. A method to facilitate consistent precision arc welding operations, comprising the steps of:

assigning a weld procedure for a welding operation;

entering optimum welding operational parameters and workpiece operational parameters for said procedure into an apparatus for facilitating precision welding;

interactively welding in response to contemporaneous feedback of welding operational parameters, temporary interruption of the welding operation, workpiece operational parameters and alarms; and acquiring and storing a log of welding operational parameters.

53. The method of claim 52, further including the step of displaying the welding operational parameters and workpiece operational parameters.

54. The method of claim 52, further including the step of programming interactive output from a means for producing an electric arc as a function of the temperature of the workpiece.

55. A method of evaluating performance of a welding operator, comprising the steps of:

assigning a weld procedure for a welding operation to evaluate performance of the welding operator;

entering optimum welding operational parameters and workpiece operational parameters for said procedure into an apparatus for facilitating precision welding;

causing the welding operator to interactively weld in response to contemporaneous feedback of welding operational parameters, temporary interruption of the welding operation, workpiece operational parameters, and alarms;

acquiring and storing a log of welding operational parameters; and comparing the log of welding operational parameters recorded to the assigned weld procedure to evaluate the performance of the welding operator.

56. A method of training welding operators, comprising the steps of:

assigning a weld procedure for a welding operation;

entering optimum welding operational parameters and workpiece operational parameters for said procedure into an apparatus for facilitating precision welding;

causing one or more welding operators to interactively weld in response to contemporaneous feedback of welding operational parameters, temporary interruption of the welding operation, workpiece operational parameters, and alarms;

acquiring and storing a log of welding operational parameters; and displaying the log of welding operational parameters acquired and stored and the assigned weld procedure to train the welding operators.

57. A method of ensuring compliance with mandated or recommended weld practices and procedures, comprising the steps of:

assigning a mandated or recommended weld procedure for a welding operation;

entering optimum welding operational parameters and workpiece operational parameters for said procedure into an apparatus for facilitating precision welding;

interactively welding in response to contemporaneous feedback of welding operational parameters, temporary interruption of the welding operation, workpiece operational parameters, and alarms;

acquiring and storing a log of welding operational parameters; and comparing the log of welding operational parameters recorded to the required weld procedure to verify compliance with the procedure.

58. A method of determining the cause of a weld joint to fail NDT inspection, comprising the steps of:

assigning a required weld procedure for a welding operation;

entering optimum welding operational parameters and workpiece operational parameters for said procedure into an apparatus for facilitating precision welding;

interactively welding in response to contemporaneous feedback of welding operational parameters, temporary interruption of the welding operation, workpiece operational parameters, and alarms;

acquiring and storing a log of welding operational parameters and workpiece operational parameters; and examining the log of welding operational parameters and workpiece operational parameters acquired and stored to determine cause of welded joint to fail NDT inspection.

59. The method of claim 58, further including step of examining the log of welding operational parameters and workpiece operational parameters acquired and stored to determine the potential for a weld joint to fail NDT inspection.

60. A method of determining whether immediate post weld treatment of a weld is feasible without the need for cooling and/or examining the workpiece, comprising the steps of:

assigning a weld procedure for a welding operation;

entering optimum welding operational parameters and workpiece operational parameters for said procedure into an apparatus for facilitating precision welding;

interactively welding in response to contemporaneous feedback of welding operational parameters, temporary interruption of the welding operation, workpiece operational parameters, and alarms;

acquiring and storing a log of welding operational parameters and workpiece operational parameters; and examining the log of welding operational parameters and workpiece operational parameters acquired and stored to determine cause of welded joint to fail NDT inspection.

61. A method for eliminating the need for post weld heat treatment for a welding operation, comprising the steps of:

assigning a temperbead weld procedure for a welding operation;

entering optimum welding operational parameters and workpiece operational parameters for said procedure into an apparatus for facilitating precision welding;

interactively welding in response to contemporaneous feedback of welding operational parameters, temporary, interruption of the welding operation, workpiece operational parameters, and alarms;

acquiring and storing a log of welding operational parameters and workpiece operational parameters; and examining the log of welding operational parameters and workpiece operational parameters acquired and stored to confirm effectiveness of said procedure.

\* \* \* \* \*

UNITED STATES PATENT AND TRADEMARK OFFICE
CERTIFICATE OF CORRECTION

PATENT NO. : 5,708,253  Page 1 of 2
DATED : Jan. 13, 1998
INVENTOR(S) : Bloch et al.

It is certified that error appears in the above-identified patent and that said Letters Patent is hereby corrected as shown below:

| | |
|---|---|
| Column 1, line 55 | Replace "method" With --methods-- |
| Column 2, line 10 | Replace "are" With --arc-- |
| Column 2, line 65 | Replace "are" With --arc-- |
| Column 4, line 51 | Replace "requiting" With --requiring-- |
| Column 5, line 44 | Replace "an" With --art-- |
| Column 9, line 28 | Replace "healing" With --heating-- |
| Column 11, line 1 | Replace "coveting" With --covering-- |

UNITED STATES PATENT AND TRADEMARK OFFICE
CERTIFICATE OF CORRECTION

PATENT NO. : 5,708,253
DATED : Jan. 13, 1998
INVENTOR(S) : Bloch et al.

It is certified that error appears in the above-identified patent and that said Letters Patent is hereby corrected as shown below:

Column 16, line 18        Replace "are"
                          With --arc--

Abstract,
Item [57], line 2         Replace "are"
                          With --arc--

Signed and Sealed this

Fifth Day of January, 1999

Attest:

Attesting Officer

*Acting Commissioner of Patents and Trademarks*